United States Patent
Wrobel et al.

(10) Patent No.: US 7,136,844 B2
(45) Date of Patent: Nov. 14, 2006

(54) FINDING THE MOST INTERESTING PATTERNS IN A DATABASE QUICKLY BY USING SEQUENTIAL SAMPLING

(75) Inventors: Stefan Wrobel, Bonn (DE); Tobias Scheffer, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 738 days.

(21) Appl. No.: 10/344,852

(22) PCT Filed: Aug. 18, 2001

(86) PCT No.: PCT/EP01/09541

§ 371 (c)(1),
(2), (4) Date: Apr. 7, 2001

(87) PCT Pub. No.: WO02/17133

PCT Pub. Date: Feb. 28, 2002

(65) Prior Publication Data

US 2005/0114284 A1    May 26, 2005

(30) Foreign Application Priority Data

Aug. 19, 2000 (EP) .................................. 00117900

(51) Int. Cl.
*G06F 17/30* (2006.01)

(52) U.S. Cl. ........................... 707/1; 707/4; 707/104.1; 702/83; 714/37; 714/49

(58) Field of Classification Search .............. 707/1–10, 707/100–104.1, 200–206; 702/83; 706/19, 706/61; 714/37, 49
See application file for complete search history.

(56) References Cited

U.S. PATENT DOCUMENTS 5,675,786 A * 10/1997 McKee et al. .......... 707/103 R (Continued)

OTHER PUBLICATIONS

"A Sequential Sampling Algorithm for a General Class of Utility Criteria" by Tobias Scheffer and Stefan Wrobel, University of Magdeburg, FIN/IWS, P.O. Box 4120, 39016 Magdeburg, Germany.

(Continued)

*Primary Examiner*—Shahid Alam
*Assistant Examiner*—Jean Bolte Fleurantin
(74) *Attorney, Agent, or Firm*—Birch, Stewart, Kolasch & Birch LLP (57) ABSTRACT

Many discovery problems, e.g., subgroup or association rule discovery, can naturally be cast as n-best hypotheses problems where the goal is to find the n hypotheses from a given hypothesis space that score best according to a certain utility function. We present a sampling algorithm that solves this problem by issuing a small number of database queries while guaranteeing precise bounds on confidence and quality of solutions. Known sampling approaches have treated single hypothesis selection problems, assuming that the utility be the average (over the examples) of some function—which is not the case for many frequently used utility functions. We show that our algorithm works for all utilities that can be estimated with bounded error. We provide these error bounds and resulting worst-case sample bounds for some of the most frequently used utilities, and prove that there is no sampling algorithm for a popular class of utility functions that cannot be estimated with bounded error. The algorithm is sequential in the sense that it starts to return (or discard) hypotheses that already seem to be particularly good (or bad) after a few examples. Thus, the algorithm is almost always faster than its worst-case bounds.

5 Claims, 2 Drawing Sheets

Required sample sizes (log-scale) for the KDD cup data of 1998. (a) $f = g|p - p_0|$, $k = 1$, $\delta = .1$; (b) $f = g^2|p - p_0|$; (c) $f = \sqrt{g}|p - p_0|$.

U.S. PATENT DOCUMENTS

| | | | |
|---|---|---|---|
| 6,278,989 B1* | 8/2001 | Chaudhuri et al. | 707/2 |
| 6,282,570 B1* | 8/2001 | Leung et al. | 709/224 |
| 6,532,458 B1* | 3/2003 | Chaudhuri et al. | 707/2 |
| 6,542,886 B1* | 4/2003 | Chaudhuri et al. | 707/2 |

OTHER PUBLICATIONS

"An Algorithm for Multi-Relational Discovery of Subgroups", in Principles of Data Mining and Knowledge Discovery: First European Symposium; proceedings/PKDD '97, J. Komorowski J. Zytkow (eds.), pp. 78-87, Springer Verlag, Berlin, New York, 1997.

"PALO: A Probabilistic Hill-Climbing Algoirthm", Russell Greiner, Siemens Corporate Research, Princeton, NJ. This paper expands the short article, "Probablistic Hill-Climbing: Theory and Applications" that was awarded the "Artificial Intelligence Journal Best Paper Award" at the Ninth Canadian Conference on Artificial Intelligence (CSCSI-92), in Vancouver, May 1992.

"Hoeffding Races: Accelerating Model Selection Search for Classification and Function Approximation" by Oded Maron and Andrew W. Moore.

"Adaptive Sampling Method for Scaling Up Knowledge Discovery Algorithms", by Carlos Domingo, Ricard Gavalda, and Osamu Watanabe, Technical Reports on Mathematical and Computing Sciences: TR-C131, 1999.

"Sampling Large Databases for Association Rules" by Hannu Toivonen, University of Helsiniki, Department of Computer Sciences, FIN-00014 University of Helsinki, Finland.

* cited by examiner

Figure 1: Sample sizes for the juice purchases database. (a) $f = g|p - p_0|, k = 1, \delta = .1$; (b) $k = 2$; (c) $k = 3$; (d) $f = g^2|p - p_0|, k = 1, \delta = .1$; (e) $k = 2$; (f) $f = \sqrt{g}|p - p_0|, k = 1, \delta = .1$ Figure 2: Required sample sizes (log-scale) for the KDD cup data of 1998. (a) $f = g|p - p_0|$; $k = 1, \delta = .1$; (b) $f = g^2|p - p_0|$; (c) $f = \sqrt{g}|p - p_0|$.

FINDING THE MOST INTERESTING PATTERNS IN A DATABASE QUICKLY BY USING SEQUENTIAL SAMPLING

This application is the national phase under 35 U.S.C. § 371 of PCT International Application No. PCT/EP01/09541 which has an International filing date of Aug. 18, 2001, which designated the United States of America.

The invention relates to finding the most interesting patterns in a database quickly by using sequential sampling in particular to a method for sampling a database for obtaining the probably approximately n best hypotheses having the highest empirically utility of a group of potential hypotheses.

1 Introduction

The general task of knowledge discovery in databases (KDD) is the "automatic extraction of novel, useful, and valid knowledge from large sets of data". An important aspect of this task is scalability, i.e., the ability to successfully perform discovery in ever-growing datasets. Unfortunately, even with discovery algorithms optimized for very large datasets, for many application problems it is infeasible to process all of the given data. Whenever more data is available than can be processed in reasonable time, an obvious strategy is to use only a randomly drawn sample of the data. Clearly, if parts of the data are not looked at, it is impossible in general to guarantee that the results produced by the discovery algorithm will be identical to the rest res turned on the complete dataset. If the use of sampled datasets is to be more than a practitioner's "hack", sampling must be combined with discovery algorithms in a fashion that allows us to give the user guarantees about how far the results obtained using sampling differ from the optimal (non-sampling based) results. The goal of a sampling discovery algorithm then is to guarantee this quality using the minimum amount of examples [5].

Known algorithms that do give rigorous guarantees on the quality of the returned solutions for all possible problems usually require an impractically large amount of data. One approach to finding practical algorithms is to process a fixed amount of data but determine the possible strength of the quality guarantee dynamically, based on characteristics of the data; this is the idea of self-bounding learning algorithms and shell decomposition bounds. Another approach (which we pursue) is to demand a certain fixed quality and determine the required sample size dynamically based on characteristics of the data that have already been seen; this idea has originally been referred to as sequential analysis.

In the machine learning context, the idea of sequential sampling has been developed into the Hoeffding race algorithm [3] which processes examples incrementally, updates the empirical utility values simultaneously, and starts to output (or discard) hypotheses as soon as it becomes very unlikely that some hypothesis is not near-optimal (or very poor, respectively). The incremental greedy learning algorithm Palo [2] has been reported to require many times fewer examples than the worst-case bounds suggest. In the context of knowledge discovery in databases, too, sequential sampling algorithms can reduces the required amount of data significantly [1].

These existing sampling algorithms address discovery problems where the goal is to select from a space of possible hypotheses H one of the elements with maximal value of an instance-averaging quality function f, or all elements with an f-value above a user-given threshold (e.g., all association rules with sufficient support). With instance-averaging quality functions, the quality of a hypothesis h is the average across all instances in a dataset D of an instance quality function $f_{inst}$.

Many discovery problems, however, cannot easily be cast in this framework. Firstly, it is often more natural for a user to ask for the n best solutions instead of the single best or all hypotheses above a threshold—see, e.g., [7]. Secondly, many popular quality measures cannot be expressed as an averaging quality function. This is the case e.g., for all functions that combine generality and distributional properties of a hypothesis; generally, both generality and distributional properties (such as accuracy) have to be considered for association rule and subgroup discovery problems. The task of subgroup discovery is to find maximally general subsets of database transactions within which the distribution of a focused feature differs maximally from the default probability of that feature in the whole database. As an example, consider the problem of finding groups of customers who are particularly likely (or unlikely) to buy a certain product.

In this paper, we present a general sampling algorithm for the n-best hypotheses problem that works for any utility functions that can be estimated with bounded error at all. To this end, in Section 2, we first define the n-best hypotheses problem more precisely and identify appropriate quality guarantees. Section 3 then presents the generic sequential sampling algorithm. In Section 4, we prove that many of the popular utility functions that have been used in the area of knowledge discovery in databases indeed can be estimated with bounded error, giving detailed bounds. In order to motivate the instantiations of our sampling algorithm and put it into context, we first define some relevant knowledge discovery tasks in Section 4. For one popular class of functions that cannot be used by our algorithm, we prove that there cannot be a sampling algorithm at all. Our results thus also give an indication as to which of the large numbers of popular utility functions are preferable with respect to sampling. In Section 6, we evaluate our results and discuss their relation to previous work.

2 Approximating n-Best Hypotheses Problems

In many cases, it is more natural for a user to ask for the n best solutions instead of the single best or all hypotheses above a threshold. Such n-best hypotheses problems can be stated more precisely as follows—adapted from [7], where this formulation is used for subgroup discovery:

Definition 1 (n-best hypotheses problem) Let D be a database of instances, H a set of possible hypotheses, f: H×D→R≧0 a quality or utility function on H, and n, 1≦n<|H|, the number of desired solutions. The n-best hypotheses problem is to find a set G⊆H of size n such that there is no $h' \in H$: $h' \notin G$ and $f(h',D) > f_{min}$, where
$f_{min} := \min_{h \in G} f(h,D)$.

Whenever we use sampling, the above optimality property cannot be guaranteed, so we must find appropriate alternative guarantees. Since for n-best problems, the exact quality and rank of hypotheses is often not central to the user, it is sufficient to guarantee that G indeed "approximately" contains the n best hypotheses. We can operationalize this by guaranteeing that there will never be a non-returned hypothesis that is "significantly" better than the worst hypothesis in our solution. More precisely, we will use the following problem formulated along the lines of PAC (probably approximately correct) learning:

Definition 2 (Approximate n-best hypotheses problem) Let D, H, f and n as in the preceding definition. Then let $\delta$, $0<\delta\leq 1$, be a user-specified confidence, and $\epsilon \in \mathbb{R}^+$ a user-specified maximal error. The approximate n-best hypotheses problem is to find a set $G \subseteq H$ of size n such that with confidence $1-\delta$, there is no $h' \in H$: $h' \notin G$ and
$f(h',D) > f_{min} + \epsilon$, where $f_{min} := \min_{h \in G} f(h,D)$.

In other words, we want to find a set of n hypotheses such that, with high confidence, no other hypothesis outperforms any one of them by more than $\epsilon$, where f is an arbitrary performance measure.

In order to design an algorithm for this problem, we need to make certain assumptions about the quality function f. Ideally, an algorithm should be capable of working (at least) with the kinds of quality functions that have already proven themselves useful in practical applications. If the problem is to classify database items (i.e., to find a total function mapping database items to class labels), accuracy is often used as utility criterion. For the discovery of association rules, by contrast, one usually relies on generality as primary utility criterion. Finally, for subgroup discovery, it is commonplace to combine both generality and distributional unusualness, resulting in relatively complex evaluation functions.

In light of the large range of existing and possible future utility functions and in order to avoid unduly restricting our algorithm, we will not make syntactic assumptions about f. In particular, unlike [1], we will not assume that f is a single probability nor that it is (a function of) an average of instance properties. Instead, we only assume that it is possible to determine a confidence interval f that bounds the possible difference between true utility (on the whole database) and estimated utility (on the sample) with a certain confidence. We expect the confidence interval to narrow as the sample size grows. As will show in Section 4 below, finding such confidence intervals is straightforward for classification accuracy, and is also possible for all but one of the popular utility functions from association rule and subgroup discovery. More precisely, we define an confidence interval for f as follows.

Definition 3 (Utility confidence interval) Let f be a utility function, let $h \in H$ be a hypothesis. Let f(h,D) denote the true quality of h on the entire dataset, $\hat{f}(h,Q_m)$ its estimated quality computed based on a sample $Q_m \subseteq D$ of size m. Then E: $\mathbb{N} \times \mathbb{R} \to \mathbb{R}$ is a utility confidence bound for f iff for any $\delta$, $0 < \delta \leq 1$, $$Pr_S[|\hat{f}(h, Q_m) - f(h, D)| \leq E(m, \delta)] \geq 1 - \delta \quad (1)$$

Equation 1 says that E provides a two-sided confidence interval on $\hat{f}(h;Q_m)$ with confidence $\delta$. In other words, the probability of drawing a sample $Q_m$ (when drawing m transactions independently and identically distributed from D), such that the difference between true and estimated utility of any hypothesis disagree by $\epsilon$ or more (in either direction) lies below $\delta$. If, in addition, for any $\delta, 0 < \delta \leq 1$ and any $\epsilon$ there is a number m such that $E(m,\delta) \leq \epsilon$ we say that the confidence interval vanishes. In this case, we can shrink the confidence interval (at any confidence level $\delta$) to arbitrarily low nonzero values by using a sufficiently large sample. We sometimes write the confidence interval for a specific hypothesis h as $E_h(m,\delta)$. Thus, we allow the confidence interval to depend on characteristics of h, such as the variance of one or more random variables that the utility of h depends on.

We will discuss confidence intervals for different functions of interest in Section 4; here, as a simple example, let us only note that if f is simply a probability over the examples, then we can use the Chernoff inequality to derive a confidence interval; when f is the average (over the examples) of some function with bounded range, then the Hoeffding inequality implies a confidence interval. Of course, we should also note that the trivial function $E(m,\delta) := \Lambda$ is an error probability bound function for any f with lower bound of zero and upper bound of $\Lambda$, but we will see that we can only guarantee termination when the confidence interval vanishes as the sample size grows.

3 Sampling Method According to the Invention

According to the invention there is provided a method for sampling a database for obtaining the probably approximately n best hypotheses having the highest empirically utility of a group of potential hypotheses, comprising the steps of (see also Table 1 of this specification):

a) generating all possible hypotheses based on specifications of a user as remaining hypotheses, b) checking whether enough data points were sampled so far to distinguish within the group of potential hypotheses all good looking hypotheses from bad looking hypotheses with sufficient confidence, c) if according to step b) enough data points were sampled so far then continue with step j) otherwise continue with step f), d) sampling one or more data points, e) calculating the utility of all the remaining hypotheses on the basis of the sampled data points, f) in the set of remaining hypotheses determining a set of good looking hypotheses by taking the n hypotheses that currently have the highest utility based on the data points sampled so far, whereas the other hypotheses are added to a set of bad looking hypotheses, g) checking each of the remaining hypotheses wherein i) if the currently considered hypothesis with sufficient probability is sufficiently good when compared to all bad looking hypotheses then
outputting the currently considered hypothesis,
removing the currently considered hypothesis from the set of remaining hypotheses and from the set of good looking hypotheses,
decrementing the number of hypotheses still to be found and
if the number of hypotheses still to be found is zero or the number of remaining hypotheses is equal to the number of hypotheses still to be found, then continue with step j), ii) if the currently considered hypotheses with sufficient probability is sufficiently bad when compared with all the good looking hypotheses then
removing the currently considered hypothesis from the set of bad looking hypotheses from the set of remaining hypotheses and
if the number of remaining hypotheses is equal to the number of hypotheses still to be found, then continue with step j), h) continue with step a), j) outputting to a user the n best hypotheses having the highest utility of all the remaining hypotheses.

In one embodiment in steps a), g)i), and g)ii the following step k) is performed:

k) determining a utility confidence interval given a required maximum probability of error and a sample size based on the observed variance of each hypothesis' utility value.

In another embodiment in step a) the following step l) is performed (see step 2. of Table 1):

l) based on step k) determining the size of the utility confidence interval for the current data point sample size and the probability of error as selected by the user and dividing the size of the utility confidence interval by two and by the number of remaining hypotheses, wherein enough data points are sampled if the number as calculated above is smaller than the user selected maximum margin of error divided by two.

In still another aspect of the invention in step f)i) the following steps are performed (see step 3.(e)i. of Table 1):

m) determine a locally allowed error probability based on the probability of error selected by the user divided by two and the number of remaining hypotheses and the smallest data point sample size that makes the error confidence interval according to step j) smaller than or equal to the user selected maximum error margin when determined based on the user selected error probability divided by two and the size of the initial set of hypotheses, n) for each of the bad looking hypotheses, determine the sum of its observed utility value and its error confidence interval size as determined according to step k) for the current data point sample size and the locally allowed error probability error according to step m), o) selecting the maximum value of all the sums determined in step n), p) subtracting the user selected maximum error margin from the value selected in step o), q) adding to the number obtained in step p) the size of the error confidence interval as determined according to step k) for the hypothesis currently considered for outputting based on the current data point sample size and the locally allowed error probability, r) if the number determined according to steps m) to q) is no larger than the hypothesis currently considered for outputting and this hypothesis is a good looking one, then this hypothesis is considered sufficiently good with sufficient probability as required in step g)i).

In a further aspect of the invention in step g)ii) the following steps are performed (see step 3(e)ii. of Table 1):

s) determine a locally allowed error probability based on the probability of error selected by the user divided by two and the number of remaining hypotheses and the smallest data point sample size that makes the error confidence interval according to step k) smaller than or equal to the user selected maximum error margin when determined based on the user selected error probability divided by two and the size of the initial set of hypotheses, t) for each good looking hypothesis determine the difference between its observed utility value and its error confidence interval as determined in step k) based on the current data point sample size and the locally allowed error probability as determined in step s), u) selecting the minimum of all the differences determined in step t), v) subtract from the value selected in step u) the size of the utility confidence interval of the hypothesis considered for the removal and determined according to step k) and the locally allowed error probability as determined in step s), w) if the number determined in steps s) to v) is not smaller than the observed utility of the hypothesis considered for removal then this hypothesis is considered sufficiently bad with sufficient probability as required in step g)ii).

The general approach to designing a sampling method is to use an appropriate error probability bound to determine the required number of examples for a desired level of confidence and accuracy. When estimating a single probability, Chernoff bounds that are used in PAC theory and many other areas of statistics and computer science can be used to determine appropriate sample bounds [5]. When such algorithms are implemented, the Chernoff bounds can be replaced by tighter normal or t distribution tables.

Unfortunately, the straightforward extension of such approaches to selection or comparison problems like the n-best hypotheses problem leads to unreasonably large bounds: to avoid errors in the worst case, we have to take very large samples to recognize small differences in utility, even if the actual differences between hypotheses to be compared are very large. This problem is addressed by sequential sampling methods (that have also been referred to as adaptive sampling methods [1]). The idea of sequential sampling is that when a difference between two frequencies is very large after only a few examples, then we can conclude that one of the probabilities is greater than the other with high confidence; we need not wait for the sample size specified by the Chernoff bound, which we have to when the frequencies are similar. Sequential sampling methods have been reported to reduce the required sample size by several orders of magnitude (e.g., [2]).

In our method (see Table 1), we combine sequential sampling with the popular "loop reversal" technique found in many KDD algorithms. Instead of processing hypotheses one after another, and obtaining enough examples for each hypothesis to evaluate it sufficiently precisely, we keep obtaining examples (step 3b) and apply these to all remaining hypotheses simultaneously (step 3c). This strategy allows the algorithm to be easily implemented on top of database systems (assuming they are capable of drawing samples), and enables us to reach tighter bounds. After the statistics of each remaining hypothesis have been updated, the algorithm checks all remaining hypotheses and (step 3(e)i) outputs those where it can be sufficiently certain that the number of better hypotheses is no larger than the number of hypotheses still to be found (so they can all become solutions), or (step 3(e)ii) discards those hypotheses where it can be sufficiently certain that the number of better other hypotheses is at least the number of hypotheses still to be found (so it can be sure the current hypothesis does not need to be in the solutions). When the algorithm has gathered enough information to distinguish the good hypotheses that remain to be found from the bad ones with sufficient probability, it exits in step 3.

Indeed it can be shown that this strategy leads to a total error probability less than $\delta$ as required.

TABLE 1

Sequential sampling algorithm for the n-best hypotheses problem

Algorithm Generic Sequential Sampling. Input: n (number of desired hypotheses),
$\epsilon$ and $\delta$ (approximation and confidence parameters). Output: n approximately best
hypotheses (with confidence $1 - \delta$).

1. Let $n_1 = n$ (the number of hypotheses that we still need to find) and Let $H_1 = H$
   (the set of hypotheses that have, so far, neither
   been discarded nor accepted). Let $Q_0 = \emptyset$ (no
   sample drawn yet). Let $i = 1$ (loop counter).

2. Let M be the smallest number such that $E\left(M, \frac{\delta}{2|H|}\right) \leq \frac{\varepsilon}{2}$.

3. Repeat until $n_i = 0$ Or $|H_{i+1}| = n_i$ Or $E\left(i, \frac{\delta}{2|H_i|}\right) \leq \frac{\varepsilon}{2}$ (a) Let $H_{i+1} = H_i$.
   (b) Query a random item of the database $q_i$. Let $Q_i = Q_{i-1} \cup \{q_i\}$.
   (c) Update the empirical utility $\hat{f}$ of the hypotheses in $H_i$.
   (d) Let $H_i^*$ be the $n_i$ hypotheses from $H_i$ which maximize the empirical utility $\hat{f}$.
   (e) For $h \in H_i$ While $n_i > 0$ And $|H_i| > n_i$ i. If $\hat{f}(h, Q_i) \geq E_h\left(i, \frac{\delta}{2M|H_i|}\right) + \max_{h_k \in H_i \setminus H_i^*} \{\hat{f}(h_k, Q_i) +$
      $E_{h_k}\left(i, \frac{\delta}{2M|H_i|}\right)\} - \varepsilon$ And $h \in H_i^*$ (h appears good) Then Output
      hypothesis h and then Delete h from $H_{i+1}$ and let $n_{i+1} =$
      $n_i - 1$. Let $H_i^*$ be the new set of empirically best hypotheses.

ii. Else If $\hat{f}(h, Q_i) \leq \min_{h_k \in H_i^*} \{\hat{f}(h_k, Q_i) - E_{h_k}\left(i, \frac{\delta}{2M|H_i|}\right)\} -$
       $E_h\left(i, \frac{\delta}{2M|H_i|}\right)$(h appears poor) Then Delete h from
       $H_{i+1}$. Let $H_i^*$ be the new set of empirically best
       hypotheses.

(f) Increment i.
4. Output the $n_i$ hypotheses from $H_i$ which have the highest empirical utility.

Theorem 1 The algorithm will output a group G of exactly n hypotheses such that, with confidence $1-\delta$, no other hypothesis in H has a utility which is more than $\epsilon$ higher than the utility of any hypothesis that has been returned:

$$Pr[\exists h \in H \setminus G: f(h) > f_{min} + \epsilon] \leq \delta \quad (2)$$

where $f_{min} = \min_{h' \in G}\{f(h')\}$; assuming that $|H| \geq n$.

The proof of Theorem 1 can be found in Appendix A.

Theorem 2 (Termination) If for any $\delta(0 < \delta \leq 1)$ and $\epsilon > 0$ there is a number m such that $E(m,\delta) \leq \epsilon$, then the algorithm can be guaranteed to terminate.

Correctness of Theorem 2 follows immediately from Step 3e of the algorithm. Theorem 2 says that we can guarantee termination if the confidence interval vanishes for large numbers of examples. This is a rather weak assumption that is satisfied by most utility functions, as we will see in the next section.

4 Instantiations

In order to implement the algorithm for a given utility function we have to find a utility confidence interval $E(m,\delta)$ that satisfies Equation 1 for that specific f. In this section, we will introduce some terminology, and present a list of confidence intervals for the utility functions that are most commonly used in knowledge discovery systems. Since the database is constant, we abbreviate $f(h,D)$ as $f(h)$ throughout this section.

Most of the known utility functions refer to confidence, accuracy, "statistical unusualness", support or generality of hypotheses. Let us quickly put these terms into perspective. Association rules and classification rules are predictive; for some database transaction they predict the value of an attribute given the values of some other attributes. For instance, the rule "beer=1→chips=1" predicts that a customer transaction with attribute beer=1 will also likely have the attribute chips=1. However, when a customer does not buy beer, then the rule does not make any prediction. In particular, the rule does not imply that a customer who does not buy beer does not buy chips either. The number of transactions in the database for which the rule makes a correct prediction (in our example, the number of transactions which include beer and chips) is called the support, or the generality.

Among those transitions for which the rule does make a prediction, some predictions may be erroneous. The confidence is the fraction of correct predictions among those transactions for which a prediction is made. The accuracy, too, quantifies the probability of a hypothesis conjecturing a correct attribute. However, the term accuracy is typically used in the context of classification and refers to the probability of a correct classification for a future transaction whereas the confidence refers to the database (i.e., the training data). From a sampling point of view, confidence and accuracy can be treated equally. In both cases, a relative frequency is measured on a small sample; from this frequency we want to derive claims on the underlying probability. It does not make a difference whether this probability is itself a frequency on a much larger instance space (confidence) or a "real" probability (accuracy), defined with respect to an underlying distribution on instances.

Subgroups are of a more descriptive character. They describe that the value of an attribute differs from the global mean value within a particular subgroup of transactions without actually conjecturing the value of that attribute for a new transaction. The generality of a subgroup is the fraction of all transactions in the database that belong to that subgroup. The term statistical unusualness refers to the difference between the probability $p_0$ of an attribute in the whole database and the probability p of that attribute within the subgroup. Usually, subgroups are desired to be both general (large g) and statistically unusual (large |p0−p|). There are many possible utility functions for subgroup discovery which trade generality against unusualness. Unfortunately, none of these functions can be expressed as the average (over all transactions) of an instance utility function. But, in Sections 4.2 through 4.4 we will show how instantiations of the GSS algorithm can solve sampling problems for these functions.

We would like to conclude this subsection with a remark on whether a sample should be drawn with or without replacement. When the utility function is defined with respect to a finite database, it is, in principle, possible to draw the sample without replacement. When the sample size reaches the database size, we can be certain to have solved the real, not just the approximate, n best hypothesis problem. So it should be possible to give a tighter utility confidence bound when the sample is drawn without replacement. Consider the simple case when the utility is a probability. When the sample is drawn with replacement, the relative frequency corresponding to the target probability is governed by the binomial distribution whereas, when the sample is drawn without replacement, it is governed by the hyper-geometrical distribution and we can specify a tighter bound. However, for sample sizes in the order of magnitude that we envision, the only feasible way of calculating both the hyper-geometrical distribution and the binomial distribution is to use a normal approximation. But the normal approximation of both distributions are equal and so we cannot realize the small advantage that drawing without replacement seems to promise. The same situation arises with other utility functions.

4.1 Instance-Averaging Functions

This simplest form of a utility function is the average, over all example instances, of some instance utility function $f_{inst}(h,q_i)$ where $q_i \in D$. The utility is then defined as $$f(h) = \frac{1}{|D|} \sum_{i=1} |D| f_{inst}(h, q_i)$$

(the average over the whole database) and the estimated utility is $$\hat{f}(h, Q_m) = \frac{1}{m} \sum_{q_i \in Q_m} f_{inst}(h, q_i)$$

(average over the example queries). An easy example of an instance-averaging utility is classification accuracy (where $f_{inst}(h,q_i)$ is 0 or 1). Besides being useful by itself, this class of utility functions serves as an introductory example of how confidence intervals can be derived. We assume that the possible range of utility values lies between 0 and $\Lambda$. In the case of classification accuracy, $\Lambda$ equals one.

We can use the Hoeffding inequality to bound the chance that an arbitrary (bounded) random variable X takes a value which is faraway from its expected value E(X) (Equation 3). When X is a relative frequency and E(X) the corresponding probability, then we know that $\Lambda=1$. This special case of the Hoeffding inequality is called Chernoff's inequality.

$$P_T[|X - E(X)| \le \varepsilon] \ge 1 - 2\exp\left\{-2m\frac{\varepsilon^2}{\Lambda^2}\right\} \quad (3)$$

We now need to define a confidence interval that satisfies Equation 1, where the Hoeffding inequality serves as a tool to prove Equation 1. We can easily see that Equation 4 satisfies this condition.

$$E(m, \delta) = \sqrt{\frac{\Lambda^2}{2m} \log \frac{2}{\delta}} \quad (4)$$

In Equation 5 we insert Equation 4 into Equation 1. We apply the Hoeffding inequality (Equation 3) in Equation 6 and obtain the desired result in Equation 7.

$$P_T\left[|\hat{f}(h, Q_m) - f(h)| > E(m, \delta)\right] = P_T\left[|\hat{f}(h, Q_m) - f(h)| > \sqrt{\frac{\Lambda^2}{2m} \log \frac{2}{\delta}}\right] \quad (5)$$

$$\le 2\exp\left\{-2m \frac{\left(\sqrt{\frac{\Lambda^2}{2m} \log \frac{2}{\delta}}\right)^2}{\Lambda^2}\right\} \quad (6)$$

$$\le 2\exp\left\{-\log \frac{2}{\delta}\right\} = \delta \quad (7)$$

For implementation purposes, the Hoeffding inequality is less suited since it is not very tight. For large m, we can replace the Hoeffding inequality by the normal distribution, referring to the central limit theorem. $f(h,Q_m)-f(h)$ is a random variable with mean value 0; we further know that $f(h,Q_m)$ is bounded between zero and $\Lambda$. In order to calculate the normal distribution, we need to refer to the true variance of our random variable. In step 3, the variance is not known since we do not refer to any particular hypothesis. We can only bound the variance from above and thus obtain a confidence interval E which is tighter than Hoeffding's/Chernoff's inequality and still satisfies Equation 1. $f(h,Q_m)$ is the average of m values, namely $$\frac{1}{m} \sum_{i=1}^{m} \hat{f}_{inst}(h, q_i).$$

The empirical variance $$s_{\hat{f}(h,Q_m)-f(h)} = \frac{1}{m} \sqrt{\sum_{i=1}^{m} \left(\hat{f}_{inst}(h, q_i) - \hat{f}(h, Q_m)\right)^2}$$

is maximized when $$\hat{f}(h, Q_m) = \frac{\Lambda}{2}$$

and the individual $f_{inst}(h,q_i)$ are zero for half the instances $q_i$ and $\Lambda$ for the other half of all instances. In this case, $$s \leq \frac{\Lambda}{2\sqrt{m}}.$$

Consequently, $$\frac{2\sqrt{m}\,(f(h, Q_m) - f(h))}{\Lambda}$$

is governed by the standard normal distribution which implies that Equation 8 satisfies Equation 1. z is the inverse standard normal distribution that can be looked up in a table.

$$E(m, \delta) = z_{1-\frac{\delta}{2}} \cdot \frac{\Lambda}{2\sqrt{m}} \quad (8)$$

In steps 3(e)i and 3(e)ii, we refer to specific hypotheses h and can therefore determine the empirical variance of $f(h, Q_m)$. We can define $E_h(m,\epsilon)$ as in Equation 10.

$$E(m, \delta) = z_{1-\frac{\delta}{2}} \cdot s_h \quad (9)$$

$$= z_{1-\frac{\delta}{2}} \frac{1}{m} \sqrt{\sum_{i=1}^{m} \left(f_{inst}(h, q_i) - \hat{f}(h, Q_i)\right)^2} \quad (10)$$

Note that we have simplified the situation a little. We have confused the true variance σ (the average squared distance from the true mean f(h)) and the empirical variance $S_h$ in Equation 10. The empirical variance possesses one degree of freedom less than the true variance and, to be quite accurate, we would have to refer to Student's t distribution rather than the normal distribution. Empirically, we observed that the algorithm does not start to output or discard any hypotheses until the sample size has reached the order of a hundred. In this region, Student's distribution can well be approximated by the normal distribution and we can keep this treatment (and the implementation) simple.

Let us now determine a worst-case bound on m (the number of queries that our sampling algorithm issues). The algorithm exits the for loop (at the latest) when $$E\left(m, \frac{\delta}{2|H|}\right) \leq \frac{\epsilon}{2}.$$

We can show that this is the case with certainty when $$m \geq \frac{2\Lambda^2}{\epsilon^2} \log \frac{|H|}{2\delta}.$$

In Equation 11, we expand our definition E. The $\Lambda$ and log-terms cancel out in Equation 12; we can bound the confidence interval to $\epsilon/2$ in Equation 13 as required for the algorithm to exit in step 3e.

$$E\left(\frac{2\Lambda^2}{\epsilon^2} \log \frac{4|H|}{\delta}, \frac{\delta}{2|H|}\right) = \sqrt{\frac{\Lambda^2}{2\left(\frac{2\Lambda^2}{\epsilon^2} \log \frac{4|H|}{\delta}\right)} \log \frac{2}{\left(\frac{\delta}{2|H|}\right)}} \quad (11)$$

$$= \sqrt{\frac{\epsilon^2}{4} \frac{\log \frac{4|H|}{\delta}}{\log \frac{4|H|}{\delta}}} \quad (12)$$

$$= \frac{\epsilon}{2} \quad (13)$$

But note that our algorithm will generally terminate much earlier; firstly, because we use the normal distribution (for large m) rather than the Hoeffding approximation and, secondly, our sequential sampling approach will terminate much earlier when the n best hypotheses differ considerably from many of the \bad" hypotheses. The worst case occurs only when all hypotheses in the hypothesis space are equally good which makes it much more difficult to identify the n best ones.

4.2 Functions that are Linear in g and $(p-p_0)$

The first class of nontrivial utility functions that we study weight the generality g of a subgroup and the deviation of the probability of a certain feature p from the default probability p0 equally. Hence, these functions multiply generality and distributional unusualness of subgroups. Alternatively, we can use the absolute distance $|p-p_0|$ between probability p and default probability $p_0$. The multi-class version of this function is $$g \frac{1}{c} \sum_c |p_i - p_{0_i}|$$

where $p_{0_i}$ is the default probability for class i.

Theorem 3 Let

1. $f(h) = g(p - p_0)$ and $\hat{f}(h, Q) = \hat{g}(\hat{p} - p_0)$ or

2. $f(h) = g|p - p_0|$ and $\hat{f}(h, Q) = \hat{g}|\hat{p} - p_0|$ or

3. $f(h) = g \frac{1}{c} \sum_{i=1}^{c} |p - p_{0_i}|$ and $\hat{f}(h, Q) = \hat{g} \frac{1}{c} \sum_{i=1}^{c} |\hat{p}_i - p_{0_i}|$.

Then $\Pr\left[\left|\hat{f}(h, Q_m) - f(h)\right| \leq E(m, \delta)\right] \geq 1 - \delta$ when small $m$: $E(m, \delta) = 3\sqrt{\frac{1}{2m} \log \frac{4}{\delta}}$ (14)

large $m$: $E(m, \delta) = \frac{z_{1-\frac{\delta}{4}}}{\sqrt{m}} + \frac{\left(z_{1-\frac{\delta}{4}}\right)^2}{4m}$ (15)

$$E_h(m, \delta) = z_{1-\frac{\delta}{4}}\left(s_g + s_p + z_{1-\frac{\delta}{4}} s_g s_p\right) \quad (16)$$

Proof. (3.1) In Equation 17, we insert Equation 14 into Equation 1. We refer to the union bound in Equation 18. Then, we exploit that $\epsilon^2 \leq \epsilon$ for $\epsilon \leq 1$ in Equation 19. The simple observation that $g \leq 1$ and $(p-p_0) \leq 1$ leads to Equation 20. Equations 21 and 22 are based on elementary transformations. In Equation 23, we refer to the union bound again. The key observation here is that ab cannot be greater than (c+ϵ)(d+ϵ) unless at least a>c+ϵ or b>d+ϵ. The Chernoff inequality (which is a special case of the Hoeffding inequality 3 for $\Lambda=1$) takes us to Equation 24.

$$\Pr[|\hat{f}(h, Q_m) - f(h)| > E(m, \delta)] = \Pr\left[|\hat{g}(\hat{p} - p_0) - g(p - p_0)| > 3\sqrt{\frac{1}{2m}\log\frac{4}{\delta}}\right] \quad (17)$$

$$\leq 2\Pr\left[\hat{g}(\hat{p} - p_0) - g(p - p_0) > 3\sqrt{\frac{1}{2m}\log\frac{4}{\delta}}\right] \quad (18)$$

$$\leq 2\Pr\left[\hat{g}(\hat{p} - p_0) - g(p - p_0) > 2\sqrt{\frac{1}{2m}\log\frac{4}{\delta}} + \left(\sqrt{\frac{1}{2m}\log\frac{4}{\delta}}\right)^2\right] \quad (19)$$

$$\leq 2\Pr\left[\hat{g}(\hat{p} - p_0) - g(p - p_0) > g\sqrt{\frac{1}{2m}\log\frac{4}{\delta}} + (p - p_0)\sqrt{\frac{1}{2m}\log\frac{4}{\delta}} + \left(\sqrt{\frac{1}{2m}\log\frac{4}{\delta}}\right)^2\right] \quad (20)$$

$$\leq 2\Pr\left[\hat{g}(\hat{p} - p_0) - g(p - p_0) > \left(g + \sqrt{\frac{1}{2m}\log\frac{4}{\delta}}\right)\left(p - p_0 + \sqrt{\frac{1}{2m}\log\frac{4}{\delta}}\right) - g(p - p_0)\right] \quad (21)$$

$$\leq 2\Pr\left[\hat{g}(\hat{p} - p_0) > \left(g + \sqrt{\frac{1}{2m}\log\frac{4}{\delta}}\right)\left(p - p_0 + \sqrt{\frac{1}{2m}\log\frac{4}{\delta}}\right)\right] \quad (22)$$

$$\leq 4\Pr\left[\hat{q} > \left(q + \sqrt{\frac{1}{2m}\log\frac{4}{\delta}}\right)\right] = 4\Pr\left[\hat{q} - q > \sqrt{\frac{1}{2m}\log\frac{4}{\delta}}\right] \quad (23)$$

$$\leq 4\exp\left\{-2m\frac{1}{2m}\log\frac{4}{\delta}\right\} = \delta \quad (24)$$

Let us now prove the normal approximation of the above confidence bound. We start in Equation 25 by inserting Equation 16 into Equation 1. $s_g$ and $s_p$ denote the variances of g and p, respectively. We also cover Equation 15 in this proof. The variances can be bounded from above:

$$s_g, s_p \leq \frac{1}{2\sqrt{m}}.$$

Hence, $$z_{1-\frac{\delta}{4}}\left(s_g + s_p + z_{1-\frac{\delta}{4}}s_g s_p\right) \leq 2z_{1-\frac{\delta}{4}}\frac{1}{2\sqrt{m}} + \left(z_{1-\frac{\delta}{4}}\frac{1}{2\sqrt{m}}\right)^2$$

$$\leq \frac{3z_{1-\delta/4}}{2\sqrt{m}}.$$

We expand the definition of f and apply the union bound in Equation 26. Equation 27 follows from $g \leq 1$ and $p - p_0 \leq 1$ and Equation 28 is just a factorization of $$g + z_{1-\frac{\delta}{4}}s_g.$$

Again, note that ab cannot be greater than (c+ϵ) (d+ϵ) unless a>c+ϵ or b>d+ϵ. Applying the union bound in 29 proves the claim.

$$\Pr\left[|\hat{f}(h, Q_m) - f(h)| > z_{1-\frac{\delta}{4}}\left(s_g + s_p + z_{1-\frac{\delta}{4}}s_g s_p\right)\right]$$

$$\leq 2\Pr\left[\hat{g}(\hat{p} - p_0) - g(p - p_0) > +z_{1-\frac{\delta}{4}}\left(s_g + s_p + z_{1-\frac{\delta}{4}}s_g s_p\right)\right] \quad (25)$$

-continued $$\leq 2\Pr\left[\hat{g}(\hat{p} - p_0) - g(p - p_0) > gz_{1-\frac{\delta}{4}}s_g + (p - p_0)z_{1-\frac{\delta}{4}}s_p + \left(z_{1-\frac{\delta}{4}}\right)^2 s_g s_p\right] \quad (26)$$

$$\leq 2\Pr\left[\hat{g}(\hat{p} - p_0) > \left(g + z_{1-\frac{\delta}{4}}s_g\right)\left(p - p_0 + z_{1-\frac{\delta}{4}}s_p\right)\right] \quad (27)$$

$$\leq 2\left(\Pr\left[\hat{g} > g + z_{1-\frac{\delta}{4}}s_g\right] + \Pr\left[\hat{p} > p + z_{1-\frac{\delta}{4}}s_p\right]\right) \quad (28)$$

$$\leq 2\left(\frac{\delta}{4} + \frac{\delta}{4}\right) = \delta \quad (29)$$

This completes the proof for Theorem (3.1).

(3.2) Instead of having to estimate p, we need to estimate the random variable |p−p$_0$|. We define $s_p$ to be the empirical variance of |p−p$_0$|. Since this value is bounded between zero and one, all the arguments which we used in the last part of this proof apply analogously.

(3.3) Here, the random variable is $$\frac{1}{c}\sum_{i=1}^{c}|p_i - p_{0_i}|.$$

This variable is also bounded between zero and one and so the proof is analogous to case (3.1). This completes the proof.

Theorem 4 For all function f(h) covered by Theorem 3, the sampling algorithm will terminate after at most $$m = \frac{18}{\varepsilon^2} \log \frac{8|H_i|}{\delta} \quad (30)$$

database queries (but usually much earlier).

Proof. The algorithm terminates in step 3 when $$E\left(i, \frac{\delta}{2|H|}\right) \leq \frac{\varepsilon}{2}.$$

We will show that this is always the case when $$i \geq m = \frac{16}{\varepsilon^2} \log \frac{\sqrt{6}|H_i|}{\sqrt{\delta}}.$$

We insert the sample bound (Equation 30) into the definition of E for linear functions (Equation 14), after the log-terms rule out each other in Equation 31 we obtain the desired bound of $\varepsilon/2$.

$$E\left(\frac{18}{\varepsilon^2} \log \frac{8|H|}{\delta}, \frac{\delta}{2|H|}\right) = 3\sqrt{\frac{1}{2\left(\frac{18}{\varepsilon^2}\log\frac{8|H|}{\delta}\right)} \log \frac{4}{\left(\frac{\delta}{2|H|}\right)}} \quad (31)$$

$$\leq 3\sqrt{\frac{\varepsilon^2}{36}} = \frac{\varepsilon}{2} \quad (32)$$

This completes the proof.

4.3 Functions with Squared Terms

Squared terms [7] are introduced to put more emphasis on the difference between p and the default probability.

Theorem 5 Let

1. $f(h) = g^2(p - p_0)$ and $\hat{f}(h, Q) = \hat{g}^2(\hat{p} - p_0)$ or
2. $f(h) = g^2|p - p_0|$ and $\hat{f}(h, Q) = \hat{g}^2|\hat{p} - p_0|$ or
3. $f(h) = g^2 \frac{1}{c}\sum_{i=1}^{c}|p_i - p_{0i}|$ and $\hat{f}(h, Q) = \hat{g}^2 \frac{1}{c}\sum_{i=1}^{c}|\hat{p}_i - p_{0i}|$ or Then $Pr[f(h, Q_m) - f(h, Q) \leq E(m, \delta)] \geq 1 - \delta$ when small m: $E(m, \delta) = \left(\frac{1}{2m}\log\frac{4}{\delta}\right)^{\frac{3}{2}} + 3\left(\frac{1}{2m}\log\frac{4}{\delta}\right) + 3\sqrt{\frac{1}{2m}\log\frac{4}{\delta}}$ (33)

large m: $E(m, \delta) = \frac{3}{2\sqrt{m}}z_{1-\frac{\delta}{2}} + \frac{m + \sqrt{m}}{4m\sqrt{m}}\left(z_{1-\frac{\delta}{2}}\right)^2 + \frac{1}{8m\sqrt{m}}\left(z_{1-\frac{\delta}{2}}\right)^3$ (34)

$E_h(m, \delta) =$ (35)

$2s_g z_{1-\frac{\delta}{2}} + s_g^2\left(z_{1-\frac{\delta}{2}}\right)^2 + s_p z_{1-\frac{\delta}{2}} + 2s_g s_p\left(z_{1-\frac{\delta}{2}}\right)^2 + s_p s_g^2\left(+z_{1-\frac{\delta}{2}}\right)^3$ Proof. (5.1) $f(h) = g^2(p-p_0)$ As usual, we start in Equation 37 by combining the definition of E (Equation 33) with Equation 1 which specifies the property of E that we would like to prove. In Equation 37 we exploit that $g \leq 1$ and $p - p_0 \leq 1$. In Equation 38 we add $g^2(p - p_0)$ to both sides of the inequality an start factorizing. In Equation 39 we have identified three factors. The observation that $a^2b$ cannot be greater than $(c+\epsilon)(c+\epsilon)(d+\epsilon)$ unless at least $a > c+\epsilon$ or $b > d+\epsilon$ and the union bound lead to Equation 40; the Chernoff inequality completes this part of the proof.

$Pr[|\hat{f}(h, Q_m) - f(h)| > E(m, \delta)]$ $= Pr[|\hat{g}^2(\hat{p} - p_0) - g^2(p - p_0)| >$ (36)

$\left(\frac{1}{2m}\log\frac{4}{\delta}\right)^{\frac{3}{2}} + 3\left(\frac{1}{2m}\log\frac{4}{\delta}\right) + 3\sqrt{\frac{1}{2m}\log\frac{4}{\delta}}\Big]$ $\leq 2Pr[\hat{g}^2(\hat{p} - p_0) - g^2(p - p_0) > g^2\sqrt{\frac{1}{2m}\log\frac{4}{\delta}} + 2g(p - p_0)$ (37)

$\sqrt{\frac{1}{2m}\log\frac{4}{\delta}} + 2g\left(\frac{1}{2m}\log\frac{4}{\delta}\right) + (p - p_0)\left(\frac{1}{2m}\log\frac{4}{\delta}\right) + \left(\frac{1}{2m}\log\frac{4}{\delta}\right)^{\frac{3}{2}}\Big]$ $\leq 2Pr[\hat{g}^2(\hat{p} - p_0) >$ (38)

$\left(g^2 + 2g\sqrt{\frac{1}{2m}\log\frac{4}{\delta}} + \left(\frac{1}{2m}\log\frac{4}{\delta}\right)\right)\left(p - p_0 + \sqrt{\frac{1}{2m}\log\frac{4}{\delta}}\right)\Big]$ $\leq 2Pr[\hat{g}^2(\hat{p} - p_0) > \left(g + \sqrt{\frac{1}{2m}\log\frac{4}{\delta}}\right) +$ (39)

$\left(g + \sqrt{\frac{1}{2m}\log\frac{4}{\delta}}\right)\left(p - p_0 + \sqrt{\frac{1}{2m}\log\frac{4}{\delta}}\right)\Big]$ $\leq 2\left(Pr\left[\hat{g} - g > \sqrt{\frac{1}{2m}\log\frac{4}{\delta}}\right] + Pr\left[\hat{p} - p > \sqrt{\frac{1}{2m}\log\frac{4}{\delta}}\right]\right)$ (40)

$\leq 4\exp\left\{-2m\left(\frac{1}{2m}\log\frac{4}{\delta}\right)\right\} = \delta$ (41)

Let us now look at the normal approximation. First, we will make sure that Equation 34 is a special case of Equation 35 (variance bounded from above). The variance of both g and p is at most $$\frac{1}{2\sqrt{m}}.$$

This takes us from Equation 35 to Equation 42. Equation 43 equals Equation 34.

$2s_g z_{1-\frac{\delta}{2}} + s_g^2\left(z_{1-\frac{\delta}{2}}\right)^2 + s_p z_{1-\frac{\delta}{2}} + 2s_g s_p\left(z_{1-\frac{\delta}{2}}\right)^2 +$ (42)

$s_p s_g^2\left(z_{1-\frac{\delta}{2}}\right)^3 \leq \frac{1}{\sqrt{m}}z_{1-\frac{\delta}{2}} + \frac{1}{4m}\left(z_{1-\frac{\delta}{2}}\right)^2 + \frac{1}{2\sqrt{m}}$ $z_{1-\frac{\delta}{2}} + \frac{1}{\sqrt{m}}\left(z_{1-\frac{\delta}{2}}\right)^2 + \frac{1}{8m\sqrt{m}}\left(z_{1-\frac{\delta}{2}}\right)^3$ $= \frac{3}{2\sqrt{m}}z_{1-\frac{\delta}{2}} + \frac{m + \sqrt{m}}{4m\sqrt{m}}\left(z_{1-\frac{\delta}{2}}\right)^2 + \frac{1}{8m\sqrt{m}}\left(z_{1-\frac{\delta}{2}}\right)^3$ (43)

In Equation 44 we want to see if the normal approximation (Equation 35) satisfies the requirement of Equation 1. We add $g^2(p-p_0)$ to both sides of the equation and start factorizing the right hand side of the inequality in Equations 45 and 46. The union bound takes us to Equation 47; Equation 48 proves the claim.

$Pr[|f(h, Q_m) - f(h)| > E(m, \delta)] =$ (44)

$Pr\Big[|g^2(p - p_0) - g^2(p - p_0)| > 2s_g z_{1-\frac{\delta}{2}} +$ $s_g^2\left(z_{1-\frac{\delta}{2}}\right)^2 + s_p z_{1-\frac{\delta}{2}} + 2s_g s_p\left(z_{1-\frac{\delta}{2}}\right)^2 + s_p s_g^2\left(z_{1-\frac{\delta}{2}}\right)^3\Big] \leq$ -continued $$2Pr\left[\begin{array}{c}\hat{g}^2(\hat{p}-p_0) > \left(g^2 + 2gs_g z_{1-\frac{\delta}{2}} + s_g^2\left(z_{1-\frac{\delta}{2}}\right)^2\right) \\ \left(p + s_p z_{1-\frac{\delta}{2}}\right)\end{array}\right] \leq \quad (45)$$

$$2Pr\left[\begin{array}{c}\hat{g}^2(\hat{p}-p_0) > \left(g + s_g z_{1-\frac{\delta}{2}}\right)\left(g + s_g z_{1-\frac{\delta}{2}}\right) \\ \left(p + s_p z_{1-\frac{\delta}{2}}\right)\end{array}\right] \leq \quad (46)$$

$$2\left(Pr\left[\hat{g} - g > s_g z_{1-\frac{\delta}{2}}\right] + Pr\left[\hat{p} - p > s_p z_{1-\frac{\delta}{2}}\right]\right) \leq \quad (47)$$

$$2\left(\frac{\delta}{4} + \frac{\delta}{4}\right) = \delta \quad (48)$$

This proves case (5.1). For cases (5.2) and (5.3), note that the random variables $|p-p_0|$ and $$\frac{1}{c}\sum_{i=1}^{c} c(p-p_0)$$

(both bounded between zero and one) play the role of p and the proof is analogous to the first case (5.1).

Theorem 6 For all functions f(h) covered by Theorem 5, the sampling algorithm will terminate after at most $$m = \frac{98}{\varepsilon^2}\log\frac{8|H_i|}{\delta} \quad (49)$$

Proof. The algorithm terminates in step 3 when $$E\left(i, \frac{\delta}{2|H|}\right) \leq \frac{\varepsilon}{2}.$$

The utility functions of Theorem 5 are bounded between zero and one. Hence, we can assume that $\varepsilon \leq 1$ since otherwise the algorithm might just return n arbitrarily poor hypotheses and still meet the requirements of Theorem 1. This means that the algorithm cannot exit until $$E\left(m, \frac{\delta}{2|H_i|}\right) \leq \frac{1}{2}$$

(or n hypotheses have been returned). For $$E\left(m, \frac{\delta}{2|H_i|}\right)$$

to be ½ or less, each of the three terms in Equation 33 has to be below 1. Note that if $\varepsilon < 1$ then $\varepsilon^2 < \varepsilon$. We can therefore bound E as in Equation 51.

$$E(m, \delta) = \left(\frac{1}{2m}\log\frac{4}{\delta}\right)^{\frac{3}{2}} + 3\left(\frac{1}{2m}\log\frac{4}{\delta}\right) + 3\sqrt{\frac{1}{2m}\log\frac{4}{\delta}} < \quad (50)$$

$$7\sqrt{\frac{1}{2m}\log\frac{4}{\delta}} \quad (51)$$

Now we will show that E lies below $\varepsilon/2$ when m reaches the bound described in Equation 49. We insert the sample bound into the exit criterion in Equation 52. The log-terms rule out each other and the result is $\varepsilon/2$ as desired.

$$E\left(\frac{98}{\varepsilon^2}\log\frac{8|H|}{\delta}, \frac{\delta}{2|H|}\right) < \quad (52)$$

$$7\sqrt{\frac{1}{2\left(\frac{98}{\varepsilon^2}\log\frac{8|H|}{\delta}\right)}\log\frac{4}{\left(\frac{\delta}{2|H_i|}\right)}} \leq$$

$$7\sqrt{\frac{\varepsilon^2}{4 \cdot 49}} = \frac{\varepsilon}{2} \quad (53)$$

This completes the proof.

4.4 Functions Based on the Binomial Test

The Binomial test heuristic is based on elementary considerations. Suppose that the probability p is really equal to $p_0$ (i.e., the corresponding subgroup is really uninteresting). How likely is it, that the subgroup with generality g displays a frequency of $\hat{p}$ on the sample Q with a greater difference $|\hat{p}-p_0|$? For large $|Q| \times g$, $(\hat{p}-p_0)$ is governed by the normal distribution with mean value of zero and variance at most $$\frac{1}{2\sqrt{m}}.$$

The probability density function of the normal distribution is monotonic, and so the resulting confidence is order-equivalent to $$\sqrt{m}(p-p_0)$$

(m being the support) which is factor equivalent to $$\sqrt{g}(p-p_0).$$

Several variants of this utility function have been used. Theorem 7 Let

1. $f(h) = \sqrt{g}(p-p_0)$ and $\hat{f}(h, Q) = \sqrt{\hat{g}}(\hat{p}-p_0)$ or 2. $f(h) = \sqrt{g}|p-p_0|$ and $\hat{f}(h, Q) = \sqrt{\hat{g}}|\hat{p}-p_0|$ or 3. $f(h) = \sqrt{g}\frac{1}{c}\sum_{i=1}^{c}|p_i - p_{0_i}|$ and $\hat{f}(h, Q) = \sqrt{\hat{g}}\frac{1}{c}\sum_{i=1}^{c}|\hat{p}-p_0|$.

Then $Pr[|f(h, Q_m) - f(h)| \leq E(m, \delta)] \geq 1 - \delta$ when small $m$: $E(m, \delta) = \sqrt[2]{\frac{1}{2m}\log\frac{4}{\delta}} + \sqrt[4]{\frac{1}{2m}\log\frac{4}{\delta}} + \left(\frac{1}{2m}\log\frac{4}{\delta}\right)^{\frac{3}{4}}$ (54)

large $m$: $E(m, \delta) = \sqrt{\frac{z_{1-\frac{\delta}{4}}}{2\sqrt{m}} + \frac{z_{1-\frac{\delta}{4}}}{2\sqrt{m}} + \left(\frac{z_{1-\frac{\delta}{4}}}{2\sqrt{m}}\right)^{3/2}}$ (55)

$E_h(m, \delta) = \sqrt{s_g z_{1-\frac{\delta}{4}} + s_p z_{1-\frac{\delta}{4}} + \sqrt{s_g z_{1-\frac{\delta}{4}} s_p z_{1-\frac{\delta}{4}}}}$ (56)

Proof. (7.1) In Equation 57, we insert Equation 54 into Equation 1 (the definition of E). We refer to the union bound in Equation 58 and exploit that $$\sqrt{g} \leq 1 \text{ and } p - p_0 \leq 1.$$

As usual, we factor the right hand side of the inequality in Equation 59 and use the union bound in Equation 60. Now in Equation 61 we weaken the inequality a little. Note that $$4\sqrt{x} \geq \sqrt{x-y} \text{ when } y > 0.$$

Hence, subtracting the lengthy term in Equation 61 decreases the probability of the inequality (which we want to bound from above). The reason why we subtract this term is that we want to apply the binomial equation and factor $$\sqrt{g+\epsilon} - \sqrt{g}.$$

We do this in the following steps 62 and 63 which are perhaps a little hard to check without a computer algebra system. Adding $$\sqrt{g}$$

and taking both sides of the inequality to the square leads to Equation 64, the Chernoff inequality leads to the desired default of $\delta$.

$$Pr\left[\left|\hat{f}(h, Q_m) - f(h)\right| > E(m, \delta)\right]$$

$$= 2Pr\left[\sqrt{\hat{g}}\,(\hat{p} - p_0) - \sqrt{g}\,(p - p_0) > \right. \tag{57}$$

$$\left. 2\sqrt{\frac{1}{2m}\log\frac{4}{\delta}} + \sqrt[4]{\frac{1}{2m}\log\frac{4}{\delta}} + \left(\frac{1}{2m}\log\frac{4}{\delta}\right)^{\frac{3}{4}}\right]$$

$$\leq 2Pr\left[\sqrt{\hat{g}}\,(\hat{p} - p_0) - \sqrt{g}\,(p - p_0) > \right. \tag{58}$$

$$\left. \sqrt{g}\sqrt{\frac{1}{2m}\log\frac{4}{\delta}} + (p - p_0)\sqrt[4]{\frac{1}{2m}\log\frac{4}{\delta}} + \left(\frac{1}{2m}\log\frac{4}{\delta}\right)^{\frac{3}{4}}\right]$$

$$\leq 2Pr\left[\sqrt{\hat{g}}\,(\hat{p} - p_0) > \left(\sqrt{g} + \sqrt[4]{\frac{1}{2m}\log\frac{4}{\delta}}\right)\left(p - p_0 + \sqrt{\frac{1}{2m}\log\frac{4}{\delta}}\right)\right] \tag{59}$$

$$\leq 2Pr\left[\sqrt{\hat{g}} - \sqrt{g} > \sqrt[4]{\frac{1}{2m}\log\frac{4}{\delta}}\right] + 2Pr\left[\hat{p} - p > \sqrt{\frac{1}{2m}\log\frac{4}{\delta}}\right] \tag{60}$$

$$\leq 2Pr\left[\sqrt{\hat{g}} - \sqrt{g} > \sqrt{\sqrt{\frac{1}{2m}\log\frac{4}{\delta}} - 2\left(\sqrt{g^2 + g\sqrt{\frac{1}{2m}\log\frac{4}{\delta}}}\right)}\right] + \tag{61}$$

$$2\exp\left\{-2m\frac{1}{2m}\log\frac{4}{\delta}\right\}$$

$$= 2Pr\left[\sqrt{\hat{g}} - \sqrt{g} > \right. \tag{62}$$

$$\left. \sqrt{2g + \sqrt{\frac{1}{2m}\log\frac{4}{\delta}} - 2\sqrt{g^2 + \left(g\sqrt{\frac{1}{2m}\log\frac{4}{\delta}}\right)}}\right] + \frac{\delta}{2}$$

$$= 2Pr\left[\sqrt{\hat{g}} - \sqrt{g} > \sqrt{g + \sqrt{\frac{1}{2m}\log\frac{4}{\delta}}} - \sqrt{g}\right] + \frac{\delta}{2} \tag{63}$$

$$= 2Pr\left[\hat{g} - g > \sqrt{\frac{1}{2m}\log\frac{4}{\delta}}\right] + \frac{\delta}{2} = \delta \tag{64}$$

Now we still need to prove the normal approximations (Equations 55 and 56). As usual, we would like Equation 55 to be a special case of Equation 55 with the variances bounded from above. Equation 65 confirms that this is the case since $$s_{p,g} \leq \frac{1}{2\sqrt{m}}.$$

$$\sqrt{s_g z_{1-\frac{\delta}{4}} + s_p z_{1-\frac{\delta}{4}} + \sqrt{s_g z_{1-\frac{\delta}{4}}}\, s_p z_{1-\frac{\delta}{4}}} \leq \tag{65}$$

$$\sqrt{\frac{z_{1-\frac{\delta}{4}}}{2\sqrt{m}} - \frac{z_{1-\frac{\delta}{4}}}{2\sqrt{m}} + \sqrt{\frac{z_{1-\frac{\delta}{4}}}{2\sqrt{m}}}\,\frac{z_{1-\frac{\delta}{4}}}{2\sqrt{m}}}$$

This derivation is quite analogous to the previous one. We multiply the terms on the right hand side by factor which are less or equal to one (Equation 67) and then factor the right hand side (Equation 68). We subtract a small number from $$s_g z_{1-\frac{\delta}{4}}$$

in Equation 69 and factor $$\sqrt{\hat{g}} - \sqrt{g}$$

in Equation 70 and Equation 71. Basic manipulations and the Chernoff inequality complete the proof in Equation 73.

$$Pr\left[\left|\hat{f}(h, Q_m) - f(h)\right| > E(m, \delta)\right]$$

$$\leq 2Pr\left[\sqrt{\hat{g}}\,(\hat{p} - p_0) - \sqrt{g}\,(p - p_0) > \right. \tag{66}$$

$$\left. \sqrt{s_g z_{1-\frac{\delta}{4}} + s_p z_{1-\frac{\delta}{4}} + \sqrt{s_g z_{1-\frac{\delta}{4}}}\, s_p z_{1-\frac{\delta}{4}}}\right]$$

$$\leq 2Pr\left[\sqrt{\hat{g}}\,(\hat{p} - p_0) - \sqrt{g}\,(p - p_0) > \right. \tag{67}$$

$$\left. \sqrt{g s_g z_{1-\frac{\delta}{4}} - (p - p_0) s_p z_{1-\frac{\delta}{4}} + s_g z_{1-\frac{\delta}{4}} \sqrt{s_p z_{1-\frac{\delta}{4}}}}\right]$$

$$\leq 2Pr\left[\sqrt{\hat{g}}\,(\hat{p} - p_0) > \left(\sqrt{g} + \sqrt{s_g z_{1-\frac{\delta}{4}}}\right)\left(p - p_0 + s_p z_{1-\frac{\delta}{4}} s_p\right)\right] \tag{68}$$

$$\leq 2Pr\left[\sqrt{\hat{g}} - \sqrt{g} > \sqrt{s_g z_{1-\frac{\delta}{4}}}\right] + 2Pr\left[\hat{p} - p > s_p z_{1-\frac{\delta}{4}}\right] \tag{69}$$

$$\leq 2Pr\left[\sqrt{\hat{g}} - \sqrt{g} > \sqrt{s + g z_{1-\frac{\delta}{4}} - 2\left(\sqrt{g^2 + g s_g z_{1-\frac{\delta}{4}}} + \sqrt{g^2}\right)}\right] + \frac{\delta}{2} \tag{70}$$

$$\leq 2Pr\left[\sqrt{\hat{g}} - \sqrt{g} > \sqrt{2g + s_g z_{1-\frac{\delta}{4}} - 2\left(g\left(g + s_g z_{1-\frac{\delta}{4}}\right)\right)}\right] + \frac{\delta}{2} \tag{71}$$

$$\leq 2Pr\left[\sqrt{\hat{g}} - \sqrt{g} > \sqrt{g + s_g z_{1-\frac{\delta}{4}}}\right] + \frac{\delta}{2} \tag{72}$$

$$\leq 2Pr\left[\sqrt{\hat{g}} - \sqrt{g} > s_g z_{1-\frac{\delta}{4}}\right] + \frac{\delta}{2} = \delta \tag{73}$$

This completes the proof for Theorem (7.1). The proofs of cases (7.2) and (7.2) are analogous; instead of p we need to estimate $$|p - p_0| \text{ and } \frac{1}{c}\sum_{i=1}^{c}(p_i - p_{0_i}),$$

respectively. Both random variables are bounded between zero and one and so all our previous arguments apply. This completes the proof of Theorem 7.

Theorem 8 For all functions f(h) covered by Theorem 7, the sampling algorithm will terminate after at most $$m = \frac{648}{\varepsilon^2}\log\frac{8|H_i|}{\delta} \tag{74}$$

database queries (but usually much earlier).

Proof. Proving the last theorem was a little tiring, so let us first see how we can find a simpler bound for E (Equation 54) which will help us to prove a sample size bound without having to think too hard. The middle term of Equation 55 dominates the expression since, for $$\varepsilon \le 1 \text{ it is true that } \sqrt[4]{\varepsilon} \ge \sqrt{\varepsilon} \ge \varepsilon^{\frac{3}{4}}.$$

Hence, Equation 75 provides us with an easier bound.

$$\sqrt[2]{\frac{1}{2m}\log\frac{4}{\delta}} + \sqrt[4]{\frac{1}{2m}\log\frac{4}{\delta}} + \left(\frac{1}{2m}\log\frac{4}{\delta}\right)^{\frac{3}{4}} \le 3\sqrt[4]{\frac{1}{2m}\log\frac{4}{\delta}} \tag{75}$$

The algorithm terminates in step 3 when $$E\left(m, \frac{\delta}{2|H|}\right) \le \frac{\varepsilon}{2}.$$

Considering the sample bound in Equation 74, Equation 76 proves that this is the case with guarantee. Note that, since we bounded the confidence interval quite sloppily, we expect the algorithm to terminate considerably earlier.

$$E\left(\frac{648}{\varepsilon^2}\log\frac{8|H|}{\delta}, \frac{\delta}{2|H|}\right) < 3\sqrt[4]{\frac{1}{2\left(\frac{648}{\varepsilon^2}\log\frac{8|H|}{\delta}\right)}\log\frac{4}{\left(\frac{\delta}{2|H|}\right)}} \tag{76}$$

$$\le 3\sqrt[4]{\frac{\varepsilon^2}{16\cdot 81}} = \frac{\varepsilon}{2} \tag{77}$$

This completes the proof.

4.5 Negative Results

Several independent impurity criteria have led to utility functions which are factor-equivalent to $$f(h) = \frac{g}{1-g}(p - p_0)^2;$$

e.g., Gini diversity index and twoing criterion, and the chi-square test. Note that it is also order-equivalent to the utility measure used in Inferrule. Unfortunately, this utility function is not bounded and a few examples that have not been included in the sample can impose dramatic changes on the values of this function. This motivates our negative result.

Theorem 9 There is no algorithm that satisfies Theorem 1 when $$f(h) = \frac{g}{1-g}(p - p_0)^2.$$

Proof. We need to show that $$f(h, Q_m) - f(h);$$

is unbounded for any finite m. This is easy since $$\frac{g+\varepsilon}{1-(g+\varepsilon)} - \frac{g}{1-g}$$

goes to infinity when g approaches 1 or 1-ε(Equation 78).

$$\frac{g+\varepsilon}{1-(g+\varepsilon)} - \frac{g}{1-g} = \frac{\varepsilon}{(g+\varepsilon-1)(g-1)} \tag{78}$$

This implies that, even after an arbitrarily large sample has been observed (that is smaller than the whole database), the utility of a hypothesis with respect to the sample can be arbitrarily far from the true utility. But one may argue that demanding f(h,Q) to be within an additive constant ε is overly restricted. However, the picture does not change when we require f(h,Q) only to be within a multiplicative constant, since $$\frac{g+\varepsilon}{1-(g+\varepsilon)} \bigg/ \frac{g}{1-g}$$

goes to infinity when g+ε approach 1 or g approaches zero (Equation 79).

$$\frac{g+\varepsilon}{1-(g+\varepsilon)} \bigg/ \frac{g}{1-g} = \frac{(g+\varepsilon)(1-g)}{g(1-g-\varepsilon)} \tag{79}$$

This means that no sample suffices to bound f(h,$Q_m$)-f(h) with high confidence when a particular f(h,$Q_m$) is measured. When a sampling algorithm uses all but very few database transactions as sample, then the few remaining examples may still impose huge changes on f(h,$Q_m$) which renders the use of sampling algorithms prohibitive. This completes the proof.

5 Experiments

In our experiments, we want to study the order of magnitude of examples which are required by our algorithm for realistic tasks. Furthermore, we want to measure how much of an improvement our sequential sampling algorithm achieves over a static sampling algorithm that determines the sample size with worst-case bounds.

We implemented a simple subgroup discovery algorithm. Hypotheses consist of conjunctions of up to k attribute value tests. For discrete attributes, we allow tests for any of the possible values (e.g., "color=green"); we discretize all continuous attributes and allow for testing whether the value of such attributes lies in an interval (e.g., "size ∈[2.3, 5.8]").

We also implemented a non-sequential sampling algorithm in order to quantify the relative benefit of sequential sampling. The non-sequential algorithm determines a sample size M like our algorithm does in step 2, but using the full available error probability δ rather than only δ/2. Hence, the non-sequential sampling algorithm has a lower worst-case sample size than the sequential one but never exits or returns any hypothesis before that worst-case sample bound has been reached. Sequential and non-sequential sampling algorithm use the same normal approximation and come with identical guarantees on the quality of the returned solution.

Figure 1:
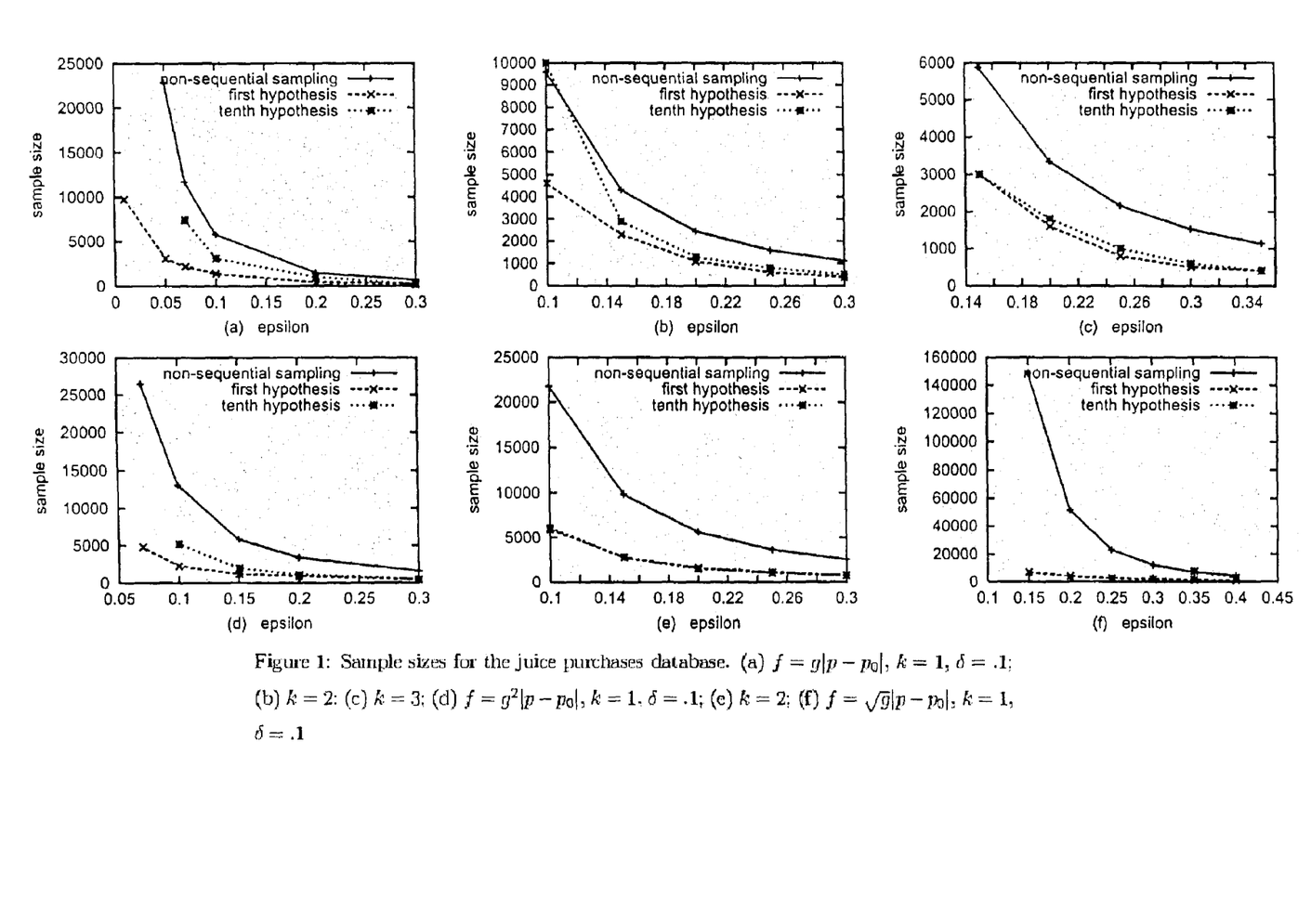
FIG. 1 shows a plurality of graphs comparing sample sizes for non-sequential and sequential sampling on a database.

For the first set of experiments, we used a database of 14,000 fruit juice purchase transactions. Each transaction is described by 29 attributes which specify properties of the purchased juice as well as attributes of the customer (e.g., age and job). The task is to identify subgroups of customers that differ from the overall average with respect to their preference for cans, recyclable bottles, or non-recyclable bottles. For this problem, we studied hypothesis spaces of size 288 (k=1, hypotheses test one attribute for a particular value), 37,717 (k=2, conjunctions of two tests), and 3,013, 794 (k=3, conjunctions of three tests). Since Æhas only a minor (logarithmic) influence on the resulting sample size, all results presented in FIG. 1 were obtained with δ=0.1. We varied the utility function; the target attribute has three possible values, so we used the utility functions $$f_1 = g\frac{1}{3}\sum_{i=1}^{3} |p_i - p_{0_i}|,$$

$$f_2 = g^2\frac{1}{3}\sum_{i=1}^{3} |p_i - p_{0_i}|, \text{ and}$$

$$f_3 = \sqrt{g}\frac{1}{3}\sum_{i=1}^{3} |p_i - p_{0_i}|.$$

FIG. 1 shows the sample size of the non-sequential algorithm as well as the sample size required before the sequential algorithm returned the first (out of ten) hypothesis and the sample size that the sequential algorithm required to return the last (tenth) hypothesis and terminate. In every single experiment that we run, the sequential sampling algorithm terminated significantly earlier than the non-sequential one, even though the latter possesses a lower worst-case sample bound. As "becomes small, the relative benefit of sequential sampling can reach orders of magnitude. Consider, for instance, the linear utility function and k=1, ε=0.1, δ=0.1. We can return the first hypothesis after 9,800 examples whereas the non-sequential algorithm returns the solution only after 565,290 examples. The sample size of the sequential algorithm is still reasonable for k=3 and we expect it not to grow too fast for larger values as the worst-case bound is logarithmic in |H|—i.e., linear in k.

For the second set of experiments, we used the data provided for the KDD cup 1998. The data contains 95,412 records that describe mailings by a veterans organization. Each record contains 481 attributes describing one recipient of a previous mailing. The target fields note whether the person responded and how high his donation to the organization was. Our task was to find large subgroups of recipients that were particularly likely (or unlikely) to respond (we used the attribute "Target B" as target and deleted "Target D"). We discretized all numeric attributes (using five discrete values); our hypothesis space consists of all 4492 attribute value tests.

Figure 2:
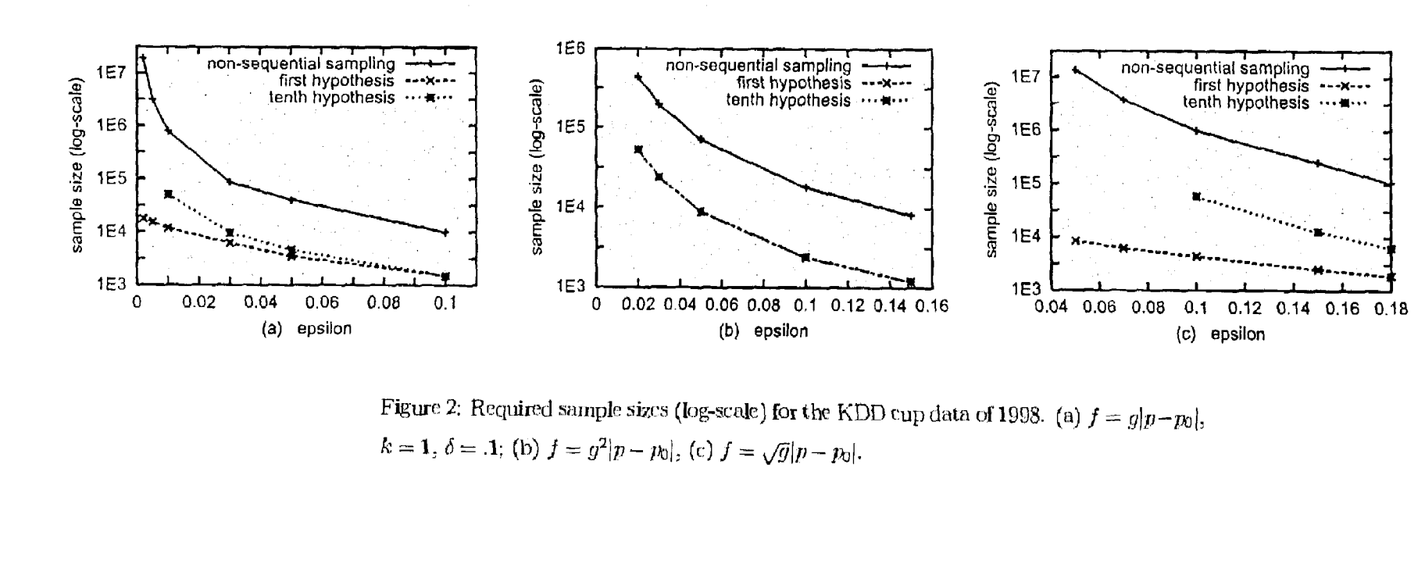
FIG. 2 shows a plurality of graphs comparing sample sizes for non-sequential and sequential sampling on a different database.

FIG. 2 displays the sample sizes that our sequential sampling algorithm, as well as the non-sequential sampling algorithm that comes with exactly the same guarantee regarding the quality of the solutions required. Note that we use a logarithmic ($\log_{10}$) scale on the y axis. Although it is fair to say that this is a large-scale problem, the sample sizes used by the sequential sampling algorithm are in a reasonable range for all three studied utility functions. Less than 10,000 examples are required when ε is as small as 0.002 for f=g|p-p_0| and f=g²|p-p_0| and when ε0 is 0.05 for $$f=\sqrt{g}|p-p_0|.$$

The relative benegit of sequential over non-sequential sampling is quite signigicant. For instance, in FIG. 2a (ε=0.002) the non-sequential algorithm requires over $10^7$ examples (of course, much more than are available) whereas the sequential one needs still less than $10^4$.

6 Discussion and Related Results

Learning algorithms that require a number of examples which can be guaranteed to suffice for finding a nearly optimal hypothesis even in the worst case have early on been criticized as being impractical. Sequential learning techniques have been known in statistics for some time [6]. [3] have introduced sequential sampling techniques into the machine learning context by proposing the "Hoeffding Race" algorithm that combines loop-reversal with adaptive Hoeffding bounds. A general scheme for sequential local search with instance-averaging utility functions has been proposed by Greiner [2].

Sampling techniques are particularly needed in the context of knowledge discovery in databases where often much more data are available than can be processed. A non-sequential sampling algorithm for KDD has been presented by Toivonen [5]; a sequential algorithm by Domingo et al. [1]. A preliminary version of the algorithm presented in this paper has been discussed in [4]. This preliminary algorithm, however, did not use utility confidence bounds and its empirical behavior was less favorable than the behavior of the algorithm presented here. Our algorithm was inspired by the local searching algorithm of Greiner [2] but differs from it in a number of ways. The most important difference is that we refer to utility confidence bounds which makes it possible to, handle all utility functions that can be estimated with bounded error even though they may not be an average across all instances.

In classification learning, error probabilities are clearly the dominating utility criterion. This is probably the reason why all sampling algorithms that have been studied so far are restricted to instance averaging utility functions. In many areas of machine learning and knowledge discovery (such as association rule and subgroup discovery), instance averaging utility functions are clearly inappropriate. The sampling algorithm of Domingo et al. [1] allows for utility criteria which are a function (with bounded derivative) of an average over the instances. This, too, does not cover popular utility functions (such as g|p-p_0|) which depend on two averages (g and |p-p_0|) across the instances. Our algorithm is more general and works for all utility criteria for which a confidence interval can be found. We presented a list of instantiations for the most popular utility function for knowledge discovery tasks and showed that there is no solution for one function. Another minor difference between our algorithm and the one of [1] is that (when the utility confidence bound vanishes) our algorithm can be guaranteed to terminate with certainty (not just high probability) when it has reached a worst-case sample size bound.

So far, learning and discovery algorithms return the best hypothesis or all hypotheses over a certain utility threshold. Often, in particular in the context of knowledge discovery tasks, a user is interested in being provided with a number of the best hypotheses. Our algorithm returns the n approximately best hypotheses.

The approach that we pursue differs from the (PAC-style) worst-case approach by requiring smaller samples in all cases that are distinct from the worst case (in which all hypotheses are equally good). Instead of operating with smaller samples, it is also possible to work with a fixed-size sample but guarantee a higher quality of the solution if the observed situation differs from this worst case. This is the general idea of shell decomposition bounds and self-bounding learning algorithms.

Although we have discussed our algorithm only in the context of knowledge discovery tasks, it should be noted that the problem which we address is relevant in a much wider context. A learning agent that actively collects data and searches for a hypothesis (perhaps a control policy) which maximizes its utility function has to decide at which point no further improvement can be achieved by collecting more data. The utility function of an intelligent agent will generally be more complicated than an average over the observations. Our sequential sampling algorithm provides a framework for solving such problems.

As it is stated currently, our algorithm represents all considered hypotheses explicitly. It can therefore only be applied practically when the hypothesis space is relatively small. This is the case for most knowledge discovery tasks. The space of all association rules or subgroups over a certain number of attributes (which grows singly exponential in the number of monomials allowed) is much smaller than, for instance, the space of all decision trees (growing doubly exponential). However, most hypothesis spaces possess a symmetric structure which renders it unnecessary to represent all hypotheses explicitly. Although there are $2^n$ decision trees with n fixed leaf nodes it is trivial to assign optimal class labels in O(n) steps without representing all $2^n$ alternatives. Similarly, the histogram of error rates of a set of decision trees or rule sets can be determined in time logarithmic in the number of hypotheses. We are confident that our sampling algorithm can be applied analogously for complex and structured hypothesis spaces without explicit representation of all hypotheses.

By giving worst-case bounds on the sample size (and proving that there is no sampling algorithm for some utility functions) our results also give an indication as to which of the many utility functions appear preferable from a sampling point of view.

REFERENCES

[1] C. Domingo, R. Gavelda, and O. Watanabe. Adaptive sampling methods for scaling up knowledge discovery algorithms. Technical Report TR-C131, Dept. de LSI, Politecnica de Catalunya, 1999.
[2] Russell Greiner. PALO: A probabilistic hill-climbing algorithm. Artificial Intelligence, 83(1–2), July 1996.
[3] O. Maron and A. Moore. Hoeffding races: Accelerating model selection search for classifocation and function approximating. In Advances in Neural Information Processing Systems, pages 59–66, 1994.
[4] T. Scheffer and S. Wrobel. A sequential sampling algorithm for a general class of utility functions. In Proceedings of the International Conference on Knowledge Discovery and Data Mining, 2000.
[5] H. Toivonen. Sampling large databases for association rules. In Proc. VLDB Conference, 1996.
[6] A. Wald. Sequential Analysis. Wiley, 1947.
[7] Stefan Wrobel. An algorithm for multi-relational discovery of subgroups. In, Proc. First European Symposion on Principles of Data Mining and Knowledge Discovery (PKDD-97), pages 78–87, Berlin, 1997, and EP-A-0 887 749.

The invention claimed is:

1. Method for sampling a database for obtaining the probably approximately n best hypotheses having the highest empirically utility of a group of potential hypotheses, comprising the steps of:
   a) generating all possible hypotheses based on specifications of a user as remaining hypotheses,
   b) checking whether enough data points were sampled so far to distinguish within the group of potential hypotheses all good looking hypotheses from bad looking hypotheses with sufficient confidence,
   c) if according to step b) enough data points were sampled so far then continue with step j) otherwise continue with step f),
   d) sampling one or more data points,
   e) calculating the utility of all the remaining hypotheses on the basis of the sampled data points,
   f) in the set of remaining hypotheses determining a set of good looking hypotheses by taking the n hypotheses that currently have the highest utility based on the data points sampled so far, whereas the other hypotheses are added to a set of bad looking hypotheses,
   g) checking each of the remaining hypotheses wherein
      i) if the currently considered hypothesis with sufficient probability is sufficiently good when compared to all bad looking hypotheses then
         outputting the currently considered hypothesis,
         removing the currently considered hypothesis from the set of remaining hypotheses and from the set of good looking hypotheses,
         decrementing the number of hypotheses still to be found and
         if the number of hypotheses still to be found is zero or the number of remaining hypotheses is equal to the number of hypotheses still to be found, then continue with step j),
      ii) if the currently considered hypotheses with sufficient probability is sufficiently bad when compared with all the good looking hypotheses then
         removing the currently considered hypothesis from the set of bad looking hypotheses from the set of remaining hypotheses and
         if the number of remaining hypotheses is equal to the number of hypotheses still to be found, then continue with step j),
   h) continue with step a),
   j) outputting to a user the n best hypotheses having the highest utility of all the remaining hypotheses.

2. Method according to claim 1, wherein in steps a), g)i) and g)ii) the following step k) is performed:
   k) determining a utility confidence interval given a required maximum probability of error and a sample size based on the observed variance of each hypothesis' utility value.

3. Method according to claim 2, wherein in step a) the following step l) is performed:
   l) based on step k) determining the size of the utility confidence interval for the current data point sample size and the probability of error as selected by the user and dividing the size of the utility confidence interval by two and by the number of remaining hypotheses, wherein enough data points are sampled if the number as calculated above is smaller than the user selected maximum margin of error divided by two.

4. Method according to claim 2 or 3, wherein in step f)i) the following steps are performed:
- m) determine a locally allowed error probability based on the probability of error selected by the user divided by two and the number of remaining hypotheses and the smallest data point sample size that makes the error confidence interval according to step j) smaller than or equal to the user selected maximum error margin when determined based on the user selected error probability divided by two and the size of the initial set of hypotheses,
- n) for each of the bad looking hypotheses, determine the sum of its observed utility value and its error confidence interval size as determined according to step k) for the current data point sample size and the locally allowed error probability error according to step m),
- o) selecting the maximum value of all the sums determined in step n),
- p) subtracting the user selected maximum error margin from the value selected in step o),
- q) adding to the number obtained in step p) the size of the error confidence interval as determined according to step k) for the hypothesis currently considered for outputting based on the current data point sample size and the locally allowed error probability,
- r) if the number determined according to steps m) to q) is no larger than the hypothesis currently considered for outputting and this hypothesis is a good looking one, then this hypothesis is considered sufficiently good with sufficient probability as required in step g)i).

5. Method according to any one of claims 2 to 4, wherein in step g)ii) the following steps are performed:
- s) determine a locally allowed error probability based on the probability of error selected by the user divided by two and the number of remaining hypotheses and the smallest data point sample size that makes the error confidence interval according to step k) smaller than or equal to the user selected maximum error margin when determined based on the user selected error probability divided by two and the size of the initial set of hypotheses,
- t) for each good looking hypothesis determine the difference between its observed utility value and its error confidence interval as determined in step k) based on the current data point sample size and the locally allowed error probability as determined in step s),
- u) selecting the minimum of all the differences determined in step t),
- v) subtract from the value selected in step u) the size of the utility, confidence interval of the hypothesis considered for the removal and determined according to step k) and the locally allowed error probability as determined in step s),
- w) if the number determined in steps s) to v) is not smaller than the observed utility of the hypothesis considered for removal then this hypothesis is considered sufficiently bad with sufficient probability as required in step g)ii).

* * * * *

UNITED STATES PATENT AND TRADEMARK OFFICE
CERTIFICATE OF CORRECTION

PATENT NO.       : 7,136,844 B2                                    Page 1 of 1
APPLICATION NO.  : 10/344852
DATED            : November 14, 2006
INVENTOR(S)      : Stefan Wrobel et al.

It is certified that error appears in the above-identified patent and that said Letters Patent is hereby corrected as shown below:

On the face of the patent, "§ 371 (c)(1), (2), (4) Date: April 07, 2001" should read --§ 371 (c)(1), (2), (4) Date: April 07, 2003--

Signed and Sealed this

Eighteenth Day of March, 2008

JON W. DUDAS
*Director of the United States Patent and Trademark Office*